United States Patent
Ucci et al.

(10) Patent No.: US 12,058,274 B2
(45) Date of Patent: Aug. 6, 2024

(54) METHOD FOR DETECTING ANOMALIES IN SSL AND/OR TLS COMMUNICATIONS, CORRESPONDING DEVICE, AND COMPUTER PROGRAM PRODUCT

(71) Applicant: Aizoon S.r.l., Turin (IT)

(72) Inventors: Daniele Ucci, Turin (IT); Filippo Sobrero, Turin (IT); Federica Bisio, Turin (IT)

(73) Assignee: AIZOON S.r.l., Turin (IT)

( * ) Notice: Subject to any disclaimer, the term of this patent is extended or adjusted under 35 U.S.C. 154(b) by 181 days.

(21) Appl. No.: 17/840,052

(22) Filed: Jun. 14, 2022

(65) Prior Publication Data

US 2022/0407722 A1 Dec. 22, 2022

(30) Foreign Application Priority Data

Jun. 16, 2021 (IT) .................. 102021000015782

(51) Int. Cl.
*H04L 9/32* (2006.01)
*H04L 9/06* (2006.01)

(52) U.S. Cl.
CPC .......... *H04L 9/3265* (2013.01); *H04L 9/0643* (2013.01); *H04L 9/3247* (2013.01); *H04L 9/3268* (2013.01)

(58) Field of Classification Search
CPC ... H04L 9/0643; H04L 9/3247; H04L 9/3265; H04L 9/3268; H04L 63/0823; H04L 63/1425; H04L 63/126; H04L 63/168
See application file for complete search history.

(56) References Cited

U.S. PATENT DOCUMENTS

| | | | |
|---|---|---|---|
| 11,057,414 B1 * | 7/2021 | Giorgio | H04L 63/1416 |
| 2016/0080363 A1 * | 3/2016 | Taboso | H04L 63/1425 |
| | | | 713/156 |

(Continued)

OTHER PUBLICATIONS

Matoušek, Petr, et al. "On reliability of JA3 hashes for fingerprinting mobile applications." Digital Forensics and Cyber Crime: 11th EAI International Conference, ICDF2C 2020, Boston, MA, USA, Oct. 15-16, 2020, Proceedings 11. Springer International Publishing. February. (Year: 2021).*

(Continued)

*Primary Examiner* — John M Macilwinen
(74) *Attorney, Agent, or Firm* — Nixon & Vanderhye P.C.

(57) ABSTRACT

Described herein is a method and network-security monitoring platform, also identified as Security Network Monitoring Platform (SNMP), for detecting anomalies in SSL and/or TLS communications set up in a communications network. The SNMP analyses data packets (DP) for detecting anomalous SSL and/or TLS handshake procedures in a monitoring interval, wherein each SSL and/or TLS handshake procedure comprises a first message sent by a respective client to a respective server for starting the respective SSL or TLS communication, and a corresponding second message sent by the respective server to the respective client. Next, the SNMP determines for each handshake procedure a first signature as a function of the data sent with the first message and a second signature as a function of the data of one or more certificates of the chain of certificates (CERT) sent with the second message. The SNMP then analyses the first and the second signatures to determine the respective popularity values. Moreover, the SNMP analyses each chain of certificates (CERT) to extract the information that indicates the fact that at least one of the certificates (CERT) of the chain is self-signed, and/or at least one of the certificates (CERT) has expired.

(Continued)

During a training step, the SNMP trains a classifier using the popularity values and the information extracted from the certificates (CERT), so that the classifier supplies as output a value that indicates whether a given handshake procedure corresponds to a usual or to an anomalous handshake procedure. Consequently, during operation in steady-state conditions, the SNMP can use the classifier to supply, for each handshake procedure, a respective value that indicates whether the respective handshake procedure corresponds to a usual handshake procedure or to an anomalous handshake procedure and, in the case where at least one handshake procedure has been classified as anomalous, generate a notification that indicates the fact that the respective SSL or TLS communication presents an anomaly.

13 Claims, 4 Drawing Sheets

(56) References Cited

U.S. PATENT DOCUMENTS

| | | | |
|---|---|---|---|
| 2018/0124085 A1 | 5/2018 | Frayman et al. | |
| 2019/0058714 A1* | 2/2019 | Joshi | H04L 63/0823 |
| 2020/0304529 A1* | 9/2020 | Fehrman | H04L 63/0236 |
| 2021/0273959 A1* | 9/2021 | Salji | G06F 21/554 |
| 2021/0336947 A1* | 10/2021 | Rubin | H04L 63/14 |
| 2022/0103593 A1* | 3/2022 | Singh | H04L 63/0245 |

OTHER PUBLICATIONS

Orans et al. "Market Guide for Network Detection and Response". Gartner. (Year: 2020).*
Althouse, John. "TLS Fingerprinting with JA3 and JA3S". Salesforce. (Year: 2019).*
Anderson, Blake, and David McGrew. "Tls beyond the browser: Combining end host and network data to understand application behavior." Proceedings of the Internet Measurement Conference. (Year: 2019).*
Yang, Jiwon, and Hyuk Lim. "Deep learning approach for detecting malicious activities over encrypted secure channels." IEEE Access 9. Mar. 2021.*
Zolotukhin, Mikhail, et al. "Data mining approach for detection of DDOS attacks utilizing SSL/TLS protocol." Internet of Things, Smart Spaces, and Next Generation Networks and Systems: 15th International Conference, NEW2AN 2015. (Year: 2015).*
Dai Rui et al. "SSL Malicious Traffic Detection Based on Multi-view Features", ICCNS 2019, Nov. 15-17, 2019, Chongqing, China pp. 40-46.
Extended European Search Report for Application No. EP 22174800.7, five pages, dated Oct. 20, 2022.
Italian Search Report with English Translation for Application No. IT 202100015782, 10 pages, dated Feb. 10, 2022.

* cited by examiner

METHOD FOR DETECTING ANOMALIES IN SSL AND/OR TLS COMMUNICATIONS, CORRESPONDING DEVICE, AND COMPUTER PROGRAM PRODUCT

This application claims priority to IT Patent Application No. 102021000015782 filed Jun. 16, 2021, the entire contents of which are hereby incorporated by reference.

TECHNICAL FIELD

The embodiments of the present disclosure relate to techniques for the analysis of SSL and/or TLS communications implemented, in particular, within one or more computers forming part of a network-security monitoring platform (NSMP), also identified as Security Network Monitoring Platform (SNMP).

BACKGROUND

Figure 1:
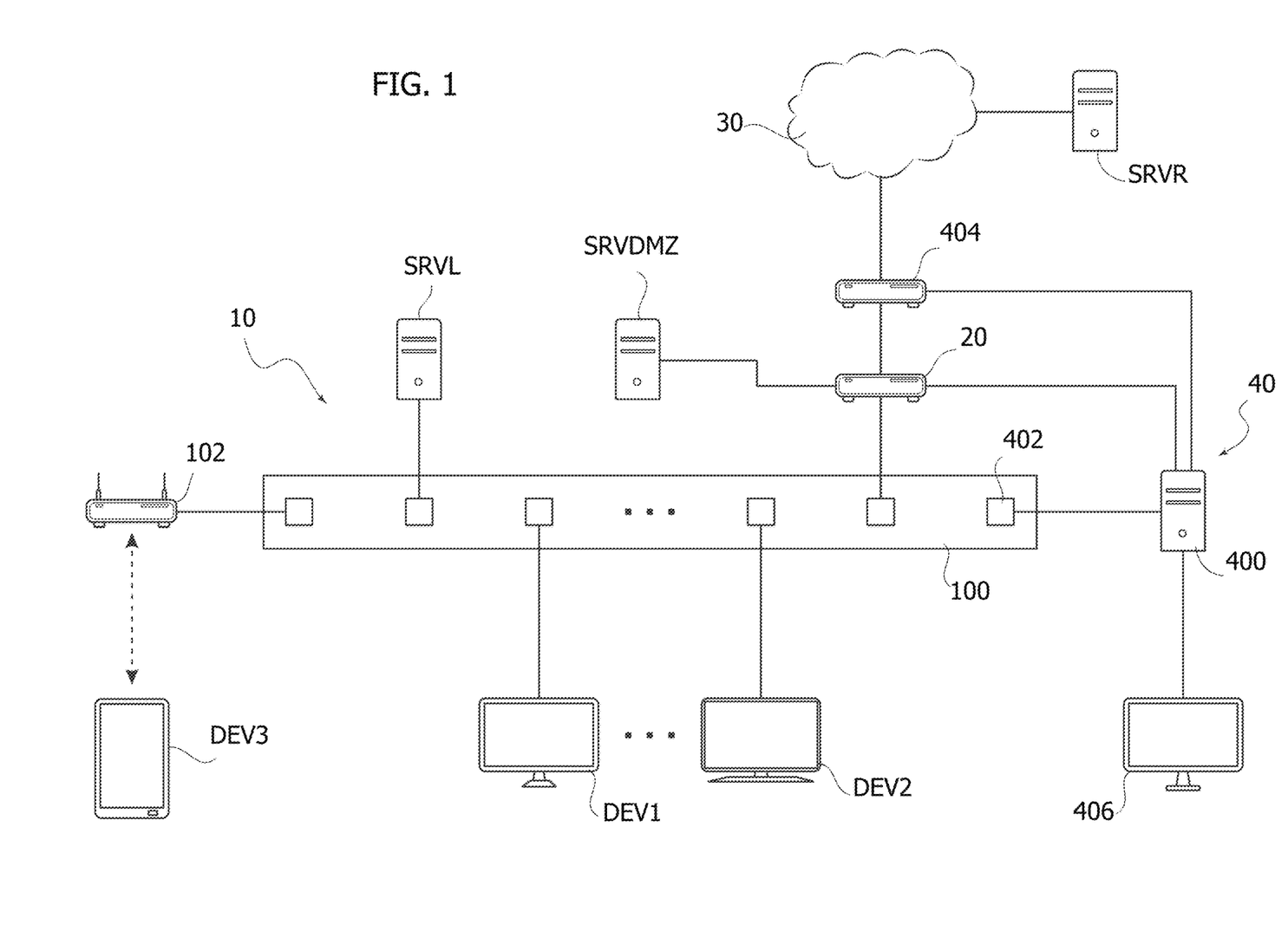
FIG. 1 shows an example of a communication system comprising a network-security monitoring platform.

FIG. 1 shows a typical communications system. In the example considered, the system comprises a router 20 configured for exchanging data between a local-area network (LAN) 10 and a wide-area network (WAN) 30, such as the Internet. For this purpose, the router 20 has an interface configured for communication with the WAN 30. This interface may be, inter alia:
- a DSL (Digital Subscriber Line) modem,
- a mobile communication interface, such as a transceiver of a GSM (Global System for Mobile Communications) type, a CDMA (Code-Division Multiple Access) type, a W-CDMA (Wideband Code-Division Multiple Access) type, a UMTS (Universal Mobile Telecommunications System) type, an HSPA (High-Speed Packet Access) type and/or an LTE (Long Term Evolution) type,
- an Ethernet communication interface (copper and/or optical fiber), and/or
- a Wi-Fi communication interface, compatible with one of the versions of the IEEE 802.11 standard.

Typically, the router 20 further comprises one or more communication interfaces for connection to the LAN 10. For example, in FIG. 1, the LAN 10 is a wired network formed by one or more switches 100, constituted for example by Ethernet ports for copper wires (typically RJ45 wires) and/or optical fibers. Consequently, one or more local clients DEV may be connected to the LAN 10 through one or more switches 100. For example, FIG. 1 shows a fixed computer DEV1 and a notebook DEV2, i.e., computers with a wired network card. In general, the LAN 10 may also comprise wireless devices, which are capable of communicating with one another and with the WAN 30, for example, via Wi-Fi. In this case, the LAN 10 envisages one or more access points 102, which are connected to one or more switches 100. For example, FIG. 1 shows a local client DEV3, which could be either a notebook or a tablet, i.e., a computer with a wireless network card. The data exchange between the various devices of the network may occur using various protocols. For example, frequently data exchange between two devices occurs via the Internet Protocol (IP). The various details of the IP protocol and of the various layers of the network protocols are well known to the person skilled in the art. Consequently, the local clients DEV may access at least one from among:
- a local server SRVL connected to the LAN 10;
- a remote server SRVR connected to the WAN 30; and
- a server SRVDMZ connected to a so-called demilitarized zone (DMZ) managed by the router 20.

Of course, the person skilled in the art will note that modern computer networks may be much more complex. In fact, the LAN 10 could also be formed by a very large number of local clients DEV, servers SRV and/or SRVDMZ, and further components of the infrastructure of the LAN 10 (for example, switches 100 and/or access points 102, routers 20, etc.). Moreover, the LAN may also comprise a plurality of LAN subnetworks, e.g., connected through a Virtual Private Network (VPN). Again, in order to improve network security, one or more of the devices may be configured as firewalls or, in general, may carry out functions of filtering of the data packets: for example, the switch 100, the access point 102, and the router 20 can implement filtering functions, while the server SRVL and/or the server SRVDMZ can function as firewall.

To improve network security further, modern computer networks frequently rely upon antivirus software, installed on the various computers (DEV, SRVL and/or SRVDMZ). The antivirus software typically monitors the programs that are downloaded and executed by a computer but, also, the traffic generated by the corresponding computer, for the protocols HTTP (Hypertext Transfer Protocol), HTTPS (HyperText Transfer Protocol over Secure Socket Layer/Transport Layer Security), POP (Post Office Protocol), in particular in its version 3 (POP3), IMAP (Internet Message Access Protocol), SMTP (Simple Mail Transfer Protocol), SMB (Server Message Block), etc.

Recently, networks have been enriched with network-security monitoring platforms, identified as Security Network Monitoring Platform (SNMP), which collect, treat, and process data flows observed in near-real time for identifying possible cyber-attacks or anomalous behaviours in the network being monitored, such as the LAN 10 and/or the DMZ.

In particular, as shown in FIG. 1, an SNMP comprises at least one computer 400. This computer 400 receives from various data-traffic sensors a copy of the data that are exchanged between different devices. Consequently, from an analysis of the data exchange, the computer 400 can detect any possible anomalous behaviours. For example, as shown in FIG. 1, these data-traffic sensors may be implemented with at least one of the following:
- a port of a so-called Switched Port Analyzer (SPAN) type, or one of its variants, such as Remote SPAN (RSPAN), Port-based SPAN (PSPAN), or VLAN-based SPAN (VSPAN), in which a managed switch 100 is configured to send a copy of the traffic exchanged through the switch 100 to the computer 400;
- a router 20 (or a firewall) configured to send a copy of the traffic exchanged through the router 20 (or the firewall) to the computer 400; or
- a dedicated passive or active terminal access point (TAP) 404 configured to send a copy of the traffic that passes through the TAP 404 to the computer 400.

Frequently, these data-traffic sensors do not necessarily send a copy of all the traffic, but may send:
- a copy of the traffic that meets given rules, for example with reference to the source port and/or destination port of the switch 100, to the source and/or destination IP address, to the TCP or UDP port, to the higher-layer protocol used, such as HTTP, etc.; and/or
- pre-processed data, wherein the sensor has already extracted some features from the data traffic, the so-called metadata.

Consequently, the computer 400 receives a copy of the traffic containing data and/or metadata that can be analysed to determine any possible anomalous behaviours. For example, the present applicant markets an SNMP platform with the name Aramis®.

An SNMP can incorporate various software components or modules that analyse, in parallel, the various features of the data traffic.

Amongst other things, in the simplest case, a component may verify whether within the data or the metadata of the traffic being monitored there are no indicators of compromise (IoCs) and/or signatures that may be correlated to malicious activities. For example, these IoCs and/or malicious signatures may be downloaded from a remote server SRVR connected to the WAN 30, such as public or proprietary sources. For instance, in the simplest case, the above IoCs may correspond to given predetermined rules, such as IP addresses and/or URLs (Uniform Resource Locators) of websites that distribute malware. On the other hand, the signatures may be used, in a way similar to a traditional antivirus, for comparing the signature of a file downloaded (for example with the protocol HTTP, POP or IMAP) with a list of signatures of malicious files. For example, these file signatures may be calculated with a hash function, such as MD5, SHA-1, SHA-2 (for example SHA-256) or SHA-3.

Recently, machine learning has been applied also in the field of cyber security in order to analyse the network traffic and detect automatically any behaviours that deviate from the normal and legitimate behaviour of the network, i.e., any behaviours that may be indicators of anomalies and/or malicious activities. For example, a machine-learning component may use one or more mathematical models with a supervised or non-supervised approach for modelling the normal behaviour of each computer DEV and/or server SRVL/SRVDMZ within the LAN 10 and/or the DMZ. Some solutions also enable monitoring of sets of devices, for example all the clients DEV that exchange traffic with the WAN. In general, for the supervised approaches, training of the models may be carried out during specific steps, on request, and/or periodically. Hence, once the mathematical model has been trained, this model may be used for classifying the current behaviour of the data exchange in the network being monitored. Consequently, whereas the first component is deterministic, the machine-learning component automatically adapts to the behaviour of a given network.

Moreover, another component may detect more complex anomalous behaviours by analysing the traffic through more sophisticated advanced analytics referred to as Advanced Cybersecurity Analytics (ACA). The purpose of these analytics is hence to identify sequences of suspect events that with a certain likelihood may be correlated to the phases of an attack. These analytics are typically based on the mathematical modelling of malicious behaviours through statistical and/or machine-learning approaches.

Use of the above three components makes it possible to alert an operator, i.e., a so-called security analyst, in a timely way in the event of an anomaly or attack, for example through the use of display of targeted graphic information and/or by sending notifications to the operator. For example, for this purpose, the computer 400 may be connected to one or more analysis terminals 406. In general, whereas FIG. 1 shows direct connections between the data-traffic sensors 20, 402, 404 and the computer 400, and between the computer 400 and the terminal 406, in the practice, this connection may be implemented via the LAN 10 and/or preferably via a dedicated network. Furthermore, as mentioned previously, the platform 400 could also comprise a number of computers that implement different components and/or analyse different traffic.

Consequently, a network-security monitoring platform provides a set of analytics, capable of identifying suspect events that can be put down to an attack.

SUMMARY

The present disclosure relates to solutions for detecting anomalies in SSL and/or TLS communications. According to one or more embodiments, the present disclosure relates to a method having the distinctive elements set forth specifically in the ensuing claims. The embodiments moreover regard a corresponding device, as well as a corresponding computer program product, which can be loaded into the memory of at least one computer and comprises portions of software code for implementing the steps of the method when the product is run on a computer. As used herein, reference to such a computer program product is understood as being equivalent to reference to a computer-readable means containing instructions for controlling a processing system in order to co-ordinate execution of the method. Reference to "at least one computer" is clearly intended to highlight the possibility of the present disclosure being implemented in a distributed/modular way.

The claims form an integral part of the technical teaching of the description provided herein.

As mentioned previously, various embodiments of the present disclosure regard a method and a corresponding SNMP for detecting anomalies in SSL and/or TLS communications set up in a communications network. The SNMP analyses for this purpose data packets sent through the communications network for detecting SSL and/or TLS handshake procedures in a monitoring interval, wherein each SSL and/or TLS handshake procedure comprises a first message sent by a respective client to a respective server for starting the respective SSL or TLS communication, and a corresponding second message sent by the respective server to the respective client. In particular, in accordance with the SSL and TLS protocols, the first message comprises data that identify one or more SSL or TLS functions supported by the client, and the second message comprises one or more certificates, typically X.509 certificates, belonging to a chain of certificates. In various embodiments, the SNMP is not only able to select the SSL and/or TLS handshake procedures in the monitoring interval, but may also filter the handshake procedures that are not of interest for the purposes of analysis. For instance, when the certificates of the respective chain of certificates that regards an end-entity is comprised in a first whitelist, or the IP address and/or the fully qualified domain name (FQDN) of the respective server is comprised in a second whitelist, and/or the domain name of the respective server is comprised in a third whitelist, the SNMP may avoid analysis of the corresponding handshake, because it is considered legitimate.

In various embodiments, the SNMP is configured to determine then for each handshake procedure a first signature on the basis of the data sent with the first message and a second signature on the basis of the data of one or more certificates of the chain of certificates sent with the second message. For instance, the first signature may be a first hash code calculated as a function of the data sent with the first message, whereas the second signature may be a second hash code calculated as a function of the data stored to the signature fields of the certificates of the chain of certificates.

In various embodiments, the SNMP is configured for analysing the first signatures obtained to determine respective first unique signatures and respective first values of occurrences in the monitoring interval. Next, the SNMP calculates for each first unique signature a first popularity value normalizing the respective first value of occurrence. Likewise, the SNMP analyses the second signatures to determine respective second unique signatures and respective second values of occurrences in the monitoring interval, and calculates for each second unique signature a second popularity value normalizing the respective second value of occurrence. For instance, to calculate for each first or second unique signature a respective first or second popularity value, the SNMP may determine the total number of the handshake procedures in the monitoring interval and calculate the first or second popularity value by dividing the respective first or second value of occurrence by the total number. Alternatively, the SNMP may determine the maximum value of the first or second value of occurrence, and calculate the first or second popularity value by dividing the respective first or second value of occurrence by the maximum value.

In various embodiments, the SNMP is moreover configured to extract from each chain of certificates a plurality of parameters that indicate whether at least one of the certificates of the chain of certificates is self-signed and/or whether at least one of the certificates of the chain of certificates has expired. In various embodiments, the plurality of parameters may moreover indicate the fact that at least one of the certificates of the chain of certificates has an anomalous validity, and/or at least one certificate of the chain of certificates is signed with a weak signature algorithm. Each certificate typically also comprises a first field for identifying a subject to which the certificate has been issued and a second field for identifying the issuer that has issued the certificate. In particular, the first and second fields typically comprise respective subfields for specifying a common name, a locality and an organization. In this case, the plurality of parameters may moreover indicate at least one of the following conditions: the domain name saved in the common-name subfield of the first field (and/or of the second field) of at least one certificate of the chain has an invalid first-level domain; the domain name saved in the common-name subfield of the first field of the certificates of the chain, which regards the end entity, does not correspond to the domain name to which the respective first message has been sent; one or more of the subfields of the first field and/or of the second field of at least one certificate of the chain of certificates comprises data classified as being randomly generated; and the country code saved in the country subfield of the first field (and/or of the second field) of at least one certificate of the chain is invalid.

In various embodiments, during a training step in which the monitoring interval corresponds to a condition of learning of the behaviour of the communications network that is being monitored, the SNMP is configured for generating a training dataset that comprises, for each handshake procedure, the first popularity value of the respective first signature, the second popularity value of the respective second signature, and the values of the respective plurality of parameters determined as a function of the data of the respective chain of certificates. Consequently, the SNMP may train a classifier using the training dataset to supply at output a value that indicates whether a given handshake procedure corresponds to a usual procedure or to an anomalous procedure. For instance, in various embodiments, the classifier is configured for classifying only a single class on the basis of the training dataset, where the single class is associated to usual handshake procedures. For instance, for this purpose, the classifier may comprise a support vector machine (SVM) configured for classifying a single class.

In various embodiments, during operation in steady-state conditions, the SNMP may then use the classifier to supply at output, for each handshake procedure, a respective value that indicates whether the respective handshake procedure corresponds to a usual or to an anomalous handshake procedure and, in the case where at least one handshake procedure has been classified as anomalous, generate a notification that indicates the fact that the respective SSL or TLS communication presents an anomaly.

In various embodiments, during the step of operation in steady-state conditions, the SNMP may filter the handshake procedures before and/or after the classification if these procedures have a respective first popularity value and/or a respective second popularity value higher than a corresponding first threshold and/or second threshold, respectively. In various embodiments, to determine the first threshold, the SNMP may determine the least popular first unique signatures in the monitoring interval, for example through a Jenks optimization of the intervals, and use as first threshold the maximum popularity value of the least popular first unique signatures. Likewise, to determine the second threshold, the SNMP may determine the least popular second unique signatures in the monitoring interval, for example through a Jenks optimization of the intervals, and use as second threshold the maximum popularity value of the least popular second unique signatures.

In various embodiments, the SNMP is configured for further filtering the handshakes classified as anomalous. In particular, during operation in steady-state conditions, the SNMP may calculate, for each of the handshake procedures classified as anomalous, a respective probability value on the basis of a parameterized cost function that takes into consideration the first popularity value of the respective first signature, the second popularity value of the respective second signature, and the respective plurality of parameters determined as a function of the data of the respective chain of certificates. Consequently, in the case where at least one of the probability values is higher than a given threshold, the SNMP may generate the notification that indicates the fact that the respective SSL or TLS communication presents an anomaly.

BRIEF DESCRIPTION OF THE DRAWINGS

The embodiments of the present disclosure will now be described with reference to the annexed drawings, which are provided purely by way of non-limiting example and in which.

DETAILED DESCRIPTION

In the ensuing description, numerous specific details are provided to enable an in-depth understanding of the embodiments. The embodiments may be implemented without one or more of the specific details, or with other methods, components, materials, etc. In other cases, operations, materials or structures that are well known are not represented or described in detail so that the aspects of the embodiments will not be obscured.

Reference throughout this description to "an embodiment" or "one embodiment" means that a particular characteristic, distinctive element, or structure described with reference to the embodiment is comprised in at least one embodiment. Hence, the use of the phrases "in an embodiment" or "in one embodiment" in various parts of this description does not necessarily refer to one and the same embodiment. Moreover, the particular characteristics, distinctive elements, or structures may be combined in any way in one or more embodiments.

The references appearing herein are provided only for convenience and do not define the sphere of protection or the scope of the embodiments.

In the ensuing FIGS. 2 to 6, the parts, elements, or components that have already been described with reference to FIG. 1 are designated by the same references as those used previously in this figure; the description of these elements that have been described previously will not be repeated hereinafter in order not to overburden the present detailed description.

As mentioned previously, the present disclosure provides solutions for detecting possible anomalies that arise during an SSL or TLS communication, in particular possible anomalies that arise during the step of SSL or TLS handshake between a client DEV of the network 10 and a server SRV, typically a remote server SRVR. For instance, the corresponding function may be implemented within a computer 40a configured for implementing a network-security monitoring platform (NSMP), also identified as Security Network Monitoring Platform (SNMP), for example via software code and/or hardware components. For a general description of such an SNMP reference may be made to the description of FIG. 1.

The SSL protocol and TLS protocol allow two nodes of a computer network to be authenticated and to establish a session key with which to protect cryptographically the rest of the session. The acronym SSL indicates the Secure Socket Layer protocol, which is the predecessor of the Transport Layer Security (TLS) protocol and was designed and released by Netscape Communications Corp., in 1995, to enable Netscape browsers to securely navigate the Internet. Four years later, IETF introduced the TLS protocol with the aim of standardizing secure communications between clients and servers. For the details of the SSL and TLS protocols reference may be made to the corresponding standards, e.g., RFC 2246, RFC 4346, RFC 5246 and RFC 844 for the various versions of TLS, the contents of which are incorporated herein for this purpose for reference. For instance, the SSL and TLS protocols may be used in combination with the protocols HTTP (Hypertext Transfer Protocol), POP (Post Office Protocol), in particular the version 3 (POP3), IMAP (Internet Message Access Protocol), and/or SMTP (Simple Mail Transfer Protocol).

Figure 2:
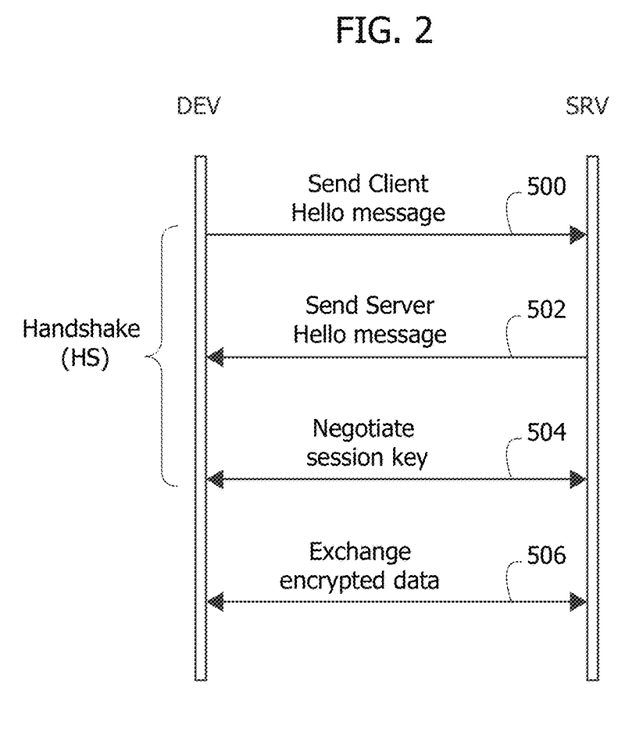
FIG. 2 is a schematic illustration of the handshake steps of the SSL and TLS protocols.

FIG. 2 is a schematic illustration of the main steps of an SSL and TLS communication. Specifically, in a step 500, a client DEV sends a connection request to a server SRV, the so-called Client Hello message, for example using an IP (Internet Protocol) communication, for instance the transport protocol TCP (Transmission Control Protocol). Typically, this message 500 also comprises the data that identify the cryptographic protocols supported by the client DEV. In response to this message, the server SRV sends an answer 502, the so-called Server Hello message, which comprises (among other data) the public key of the server. Typically, this message 502 also comprises data identifying the cryptographic protocol selected by the server SRV.

For instance, with reference to the TLS 1.0-1.2 protocols, the client DEV and the server SRV may then exchange one or more messages 504 for negotiating a session key. In particular, these protocols may use the RSA (Rivest-Shamir-Adleman) cryptographic algorithm for encrypting the session key generated by the client DEV, using the public key received with the message 502. Then, the encrypted session key is sent to the server SRV, and the latter may retrieve it using its own private key.

Instead, the TLS 1.3 protocol can use a reduced handshake based, instead, on the DH (Diffie-Hellman) cryptographic algorithm. In this case, both the client DEV and the server SRV generate dynamically, according to the DH protocol, a private key and a public key (the so-called key share). Specifically, the client DEV sends, already with the Client Hello message 500, its own key share, and the server SRV sends, with the Server Hello message 502, its own key share in addition to the chain of certificates. Consequently, the client DEV may generate the session key by combining its own private key with the key share received from the server SRV with the Server Hello message 502, and the server SRV may generate the same session key by combining its own private key with the key share received from the client DEV with the Client Hello message 500.

In particular, the above session key is used by symmetrical-encryption algorithms to enable the client DEV and the server SRV to exchange encrypted data 506. The steps used for negotiating the session key (500, 502 and optionally 504) are referred to as "handshake".

Consequently, in an SSL or TLS communication, asymmetrical-encryption algorithms are used, also referred to as "public-key algorithms", to negotiate the use of a private session key, which is then used in symmetrical-encryption algorithms. In particular, in the SSL and TLS 1.0-1.2 protocols, the public key of the server SRV is sent with a certificate that certifies the identity of the subject and of the corresponding public key. Instead, in the TLS 1.3 protocol, the public key/key share is generated dynamically. However, also in this case, the server SRV sends a certificate that certifies the identity of the subject.

Even though both the SSL protocol and the TLS protocol are able to provide a mutual authentication between the client DEV and the server SRV, it is important to note how authentication is rarely mutual: in fact, in such cases, the client DEV should have a certificate that certifies its identity. Consequently, typically only the server SRV sends its own certificate to the client, which is hence able to verify the reliability of the certificate sent by the server SRV.

In particular, the aforesaid certificates are signed messages that bear the identity of an individual, a computer, or an organization. The standard used for the TLS and SSL protocols to define the format of the certificates is the X.509 protocol.

Figure 3:
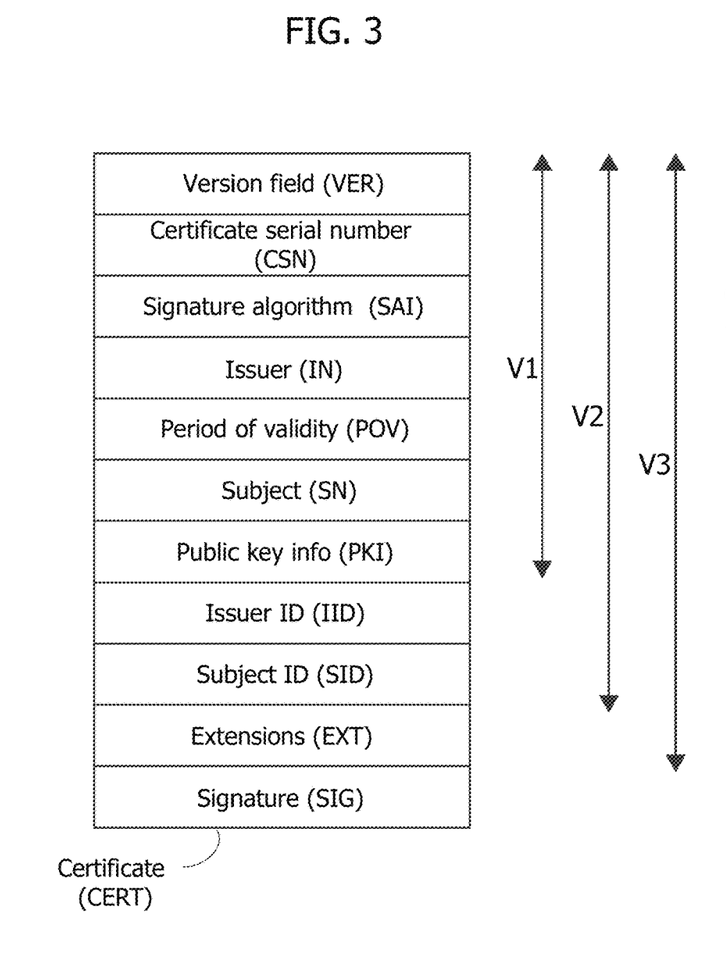
FIG. 3 is a schematic illustration of an X.509 certificate.

In this context, FIG. 3 shows the main fields of an X.509 certificate CERT. As explained previously, the purpose of the certificate CERT is to provide the information on a public key (public key info) PKI of a subject, in particular the public key itself and the algorithm applied to generate it (for example, rsaEncryption). Moreover, the certificate CERT comprises a field SN for data that identify the subject. For instance, the field SN may comprise a plurality of subfields for identifying the subject, for example a common name CN of the subject, e.g., "aizoongroup.com", a country code C, for example, "IT", a locality L, for example, "Torino", and an organization O, for example "Aizoon Consulting Srl, for short Aizoon".

However, the certificate CERT should also include information that make it possible to verify that the public key is effectively associated to the subject. For this reason, the message is issued and signed by an issuer. Consequently, the certificate CERT further comprises a field IN for the data that identify the issuer. Like the field SN, also the field IN may comprise a number of subfields, for example the common name of the issuer. Moreover, the certificate CERT comprises a field SAI for identifying the signature algorithm (ID) and the corresponding signature SIG of the certificate CERT. In particular, the field SIG contains both the algorithm identifier and the cryptographic (hash) function used by the issuer to sign the certificate (for example, sha-1WithRSAEncryption).

In addition to these basic fields, the certificate CERT further comprises a certificate serial number CSN, and data that identify a period of validity POV, i.e., the time interval during which the issuer ensures that it will keep available the information of the certified entity indicated in the field SN.

As illustrated in FIG. 3, there exist different versions of an X.509 certificate, such as the versions 1 (V1), 2 (V2), and 3 (V3). Consequently, the certificate CERT further comprises a version field VER, and possibly further fields, such as the unique identifier of the issuer (issuer ID) IID, the unique identifier of the subject (subject ID) SID and/or a field for possible extensions envisaged in version 3 of the X.509 protocol. For instance, the SSL and TLS protocols use version 3 of the X.509 protocol.

Figure 4:
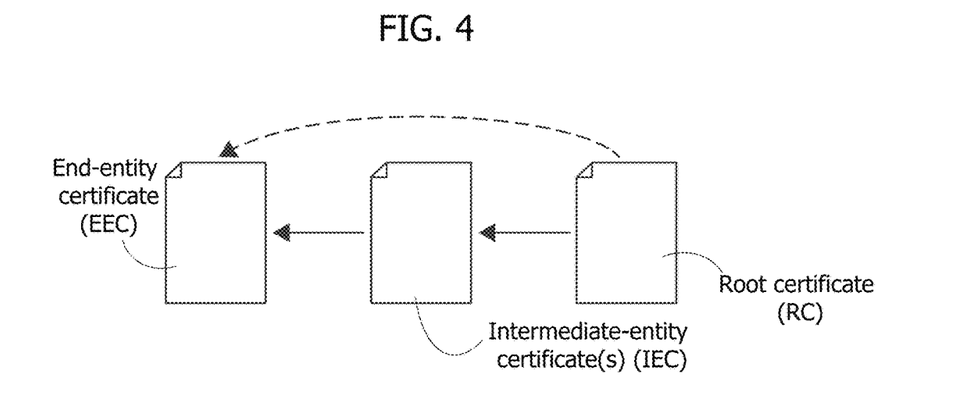
FIG. 4 is a schematic illustration of a chain of X.509 certificates.

In the web, the certificates CERT are typically signed by reliable nodes, referred to as certification authorities (CAs). In particular, as illustrated in FIG. 4, a given end-entity certificate EEC, such as an end-user certificate, supplied by a server SRV to a client DEV can be signed by a so-called root certificate RC or by a chain of one or more intermediate-entity certificates IEC, which in turn may be signed by a root certificate RC. Consequently, in the case where the client DEV has stored a list of the root certification authorities that are deemed reliable, the client DEV is able to check the certification chain of a given certificate EEC. The person skilled in the art will appreciate that a server SRV correctly configured should return, in step 502, the certificate EEC and all the intermediate-entity certificates IEC, and possibly also the root certificate RC.

It is worthwhile noting that the subject field SN and issuer field IN of a certificate CERT are used, in part, to identify both valid and suspect certification paths. For instance, in the cases where one CA issues a certificate to another CA, the value of the issuer field should correspond to the name of the issuer CA. This type of certificates, which are also known as "cross-certificates", are at the basis of secure communications of the present-day Internet and can be concatenated to constitute certification paths, as illustrated in FIG. 4. Instead, a discrepancy between the value of the subject field indicated in one certificate and the value appearing in the issuer field of the subsequent certificate jeopardises the validity of the entire path.

In addition to the cross-certificates, the X.509 certificates may be self-signed; i.e., the issuer and subject fields bear the same CA, and the private key used by the CA to sign the certificate corresponds to the public key certified by the certificate itself. For instance, a root certificate RC is typically self-signed. Consequently, the self-signed certificates may themselves also be included in certification paths and may be legitimately used by certification authorities to sponsor information regarding their activities. However, a practice increasingly used by malware is to communicate with their command and control centers using a self-signed certificate. For instance, in this case, the certificate EEC may be directly self-signed.

Hence, in various embodiments, to identify anomalous SSL and/or TLS communications observed in the network being monitored by the SNMP, the computer 40a is configured for analysing the information exchanged during the handshaking step of the SSL and/or TLS protocols.

Figure 5:
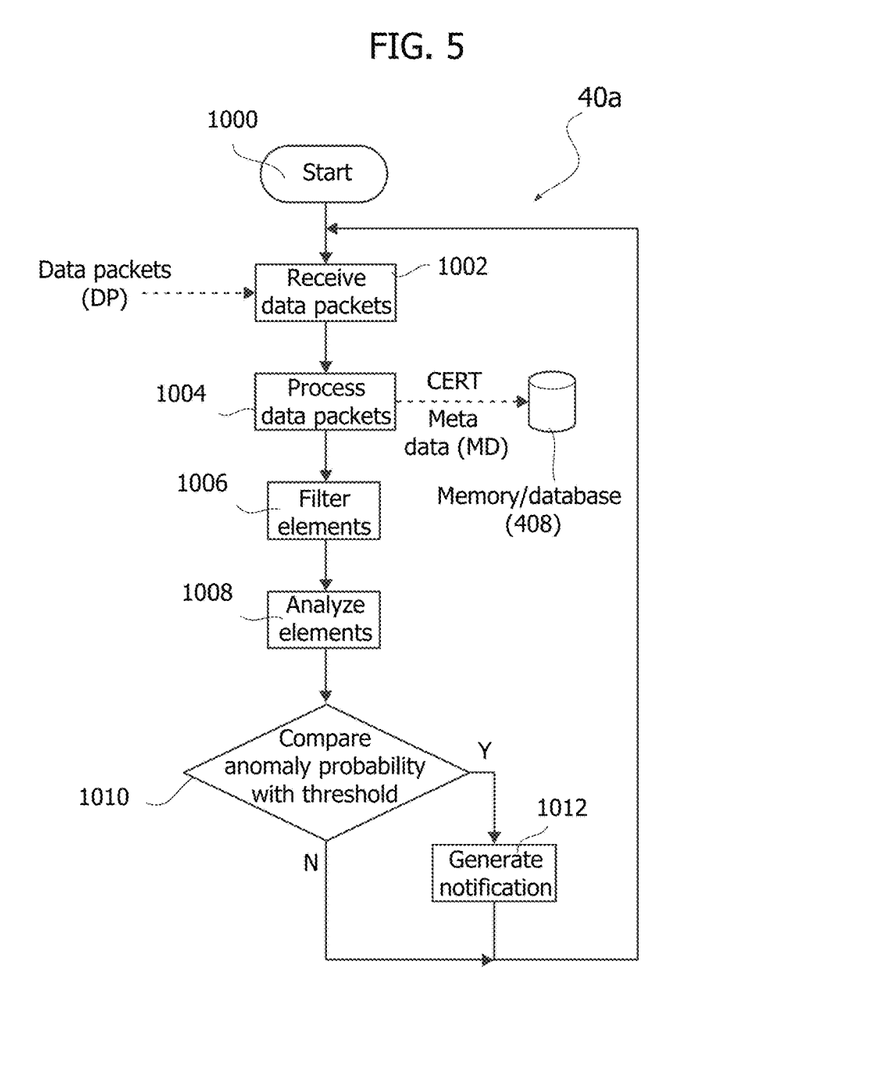
FIG. 5 shows a first embodiment of the operation of a network-security monitoring platform, where the platform detects possible anomalies in the handshaking step of the SSL and/or TLS protocols.

FIG. 5 shows an embodiment of operation of the computer 40a for analysing SSL and/or TLS communications, in particular the respective handshaking step.

After a starting step 1000, the computer 40a receives, in a step 1002, data packets DP from one or more data-traffic sensors. For instance, as explained previously, these data packets DP may be supplied by a SPAN port 402 of a switch 100, a router and/or firewall 20, a TAP 404, etc. In general, the computer 40a may also be integrated directly in one of the data-traffic sensors, for example within a firewall with sufficient computing capacity.

For instance, with reference to data packets DP in accordance with the IP protocol, each IP (IPv4 or IPv6) packet comprises a header including a source IP address and a destination IP address. Moreover, each IP packet may comprise data of a transport protocol, which comprises a payload, and possibly further routing information, for example a protocol port TCP. Consequently, in a step 1004, the computer 40a may process the data packet DP and extract data characterizing the data packet DP. For instance, in various embodiments, the computer 40a may extract from these headers routing information, such as:

in the case where the data packet DP comprises an IP packet, the IP source address and the IP destination address; and/or     in the case where the data packet DP comprises a TCP packet (possibly included in an IP packet), the respective port.

In particular, the SSL and TLS protocols form part of the application layer and are therefore included in the payload of the transport protocols that guarantee reliability of communications, as for example in the TCP packets. Consequently, analysing the payload, the computer 40a may detect at least the handshaking step of the SSL and/or TLS protocols, in particular the Client Hello message 500 with which a client DEV contacts a server SRV, and the Server Hello message 502 with which the server SRV sends its own certificate CERT.

In various embodiments, the computer 40a generates for each SSL or TLS handshake, for example by detecting the messages 500 and 502 exchanged between a client DEV and a server SRV, respective metadata MD, which may comprise:

data that identify the client DEV, for example the respective IP and/or MAC address;

data that identify the server SRV, for example the respective IP address and/or the respective domain name, which may be extracted, for example, from the connection request 500; and     one or more data sent along with the respective Client Hello message 500 and the respective Server Hello message 502.

In this context, as schematically illustrated in FIG. 5, the computer 40a may extract from the Server Hello message 502 one or more certificates CERT sent by the server SRV. In general, the computer 40a could receive one or more of the metadata MD directly from the data-traffic sensor, for example the data that identify the client DEV, the data that identify the server SRV, and the contents of the message 500 and of the message 502 (which in turn comprise the certificates sent by the server SRV).

In various embodiments, the computer 40*a* then analyses, in a step 1006, the metadata MD for selecting the handshakes SSL and/or TLS of interest that satisfy one or more rules.

Next, the computer 40*a* processes, in a step 1008, the metadata MD of the handshaking steps selected to determine possible anomalies.

Consequently, in a step 1010, the computer 40*a* may verify whether anomalies have been detected. In the case where the computer 40*a* has detected anomalous connections (output "Y" from the verification step 1010), the computer 40*a* proceeds to a step 1012, where it signals the event to an operator, for example sending a notification to the terminal 406 (see FIG. 1). Next, the computer 40*a* returns to step 1002 to receive new data packets DP and/or metadata MD.

Instead, in the case where the computer 40*a* has not detected anomalies (output "N" from the verification step 1010), it may return directly to step 1002 to receive new data packets DP and/or metadata MD.

Figure 6:
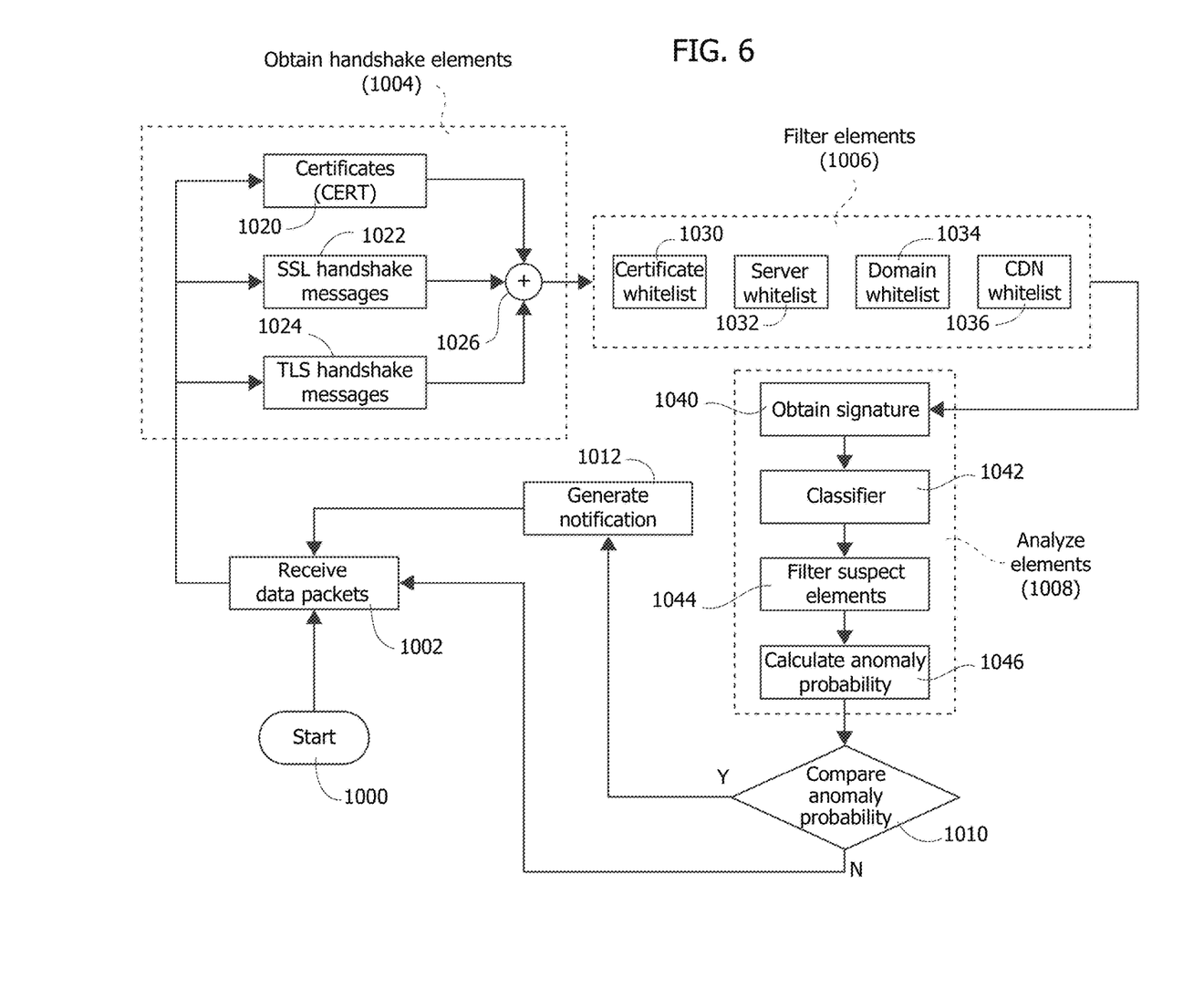
FIG. 6 shows a second embodiment of operation of a network-security monitoring platform, where the platform determines anomalies in the handshaking step of the SSL and/or TLS protocols.

FIG. 6 shows a detailed implementation of operation of the computer 40*a*. As explained previously, the computer 40*a* is configured for storing, in step 1004, metadata MD associated to the SSL and/or TLS handshakes in a memory/database 408. In general, the metadata MD may be extracted in real time, or the computer 40*a* may store at least in part the data packets DP, in particular the messages 500 and 502, and process the data packets DP periodically or upon request by an operator. In general, on the basis of the characteristics of the metadata MD, the respective metadata MD may also be stored in different databases or tables of the database 408 itself, or else simply in different log files. For instance, as illustrated schematically in FIG. 6, the computer 40*a* can handle three tables or log files:

- a table or a log 1022 for the handshake messages of the SSL protocol;
- a table or a log 1024 for the handshake messages of the TLS protocol;
- optionally a table or a log 1020 for the X.509 certificates CERT received with the Server Hello messages 502.

In various embodiments, the computer 40*a* then processes, in a step 1026, the data 1022 and/or 1024 for identifying the SSL and/or TLS handshake messages that regard SSL and/or TLS communications set up successfully between a respective client DEV and a respective SRV, and for associating to each handshake procedure the respective metadata MD. In various embodiments, the computer 40*a* moreover determines the certificate CERT or certificates of the respective chain of certificates sent by the server SRV with the message 502.

Consequently, in general, the computer 40*a* is configured for obtaining, in step 1004, a sequence of elements, in which each element is associated to a given handshake set up successfully between a client DEV and a server SRV and comprises the metadata MD of the respective handshake. For instance, as explained previously, the metadata MD of a given handshake between a client DEV and a server SRV may comprise:

- data that identify the client DEV;
- data that identify the server SRV; and
- one or more fields of the corresponding message 500 sent by the client DEV and/or one or more fields of the corresponding message 502 sent by the server SRV.

In addition, each element also comprises the certificate (or certificates) CERT of the respective chain of certificates sent by the server SRV with the message 502.

In various embodiments, the computer 40*a* then filters these data elements in step 1006. In particular, in various embodiments, the computer 40*a* selects the elements/handshakes that are comprised in a given time interval, identified hereinafter as "monitoring interval". Consequently, the metadata MD may also comprise data that identify the date and time of the corresponding handshake.

In various embodiments, the computer 40*a* may filter the elements further. For instance, for this purpose, the computer 40*a* may handle one or more lists of reliable elements, the so-called whitelists. For instance, in various embodiments, these lists may be modified manually by an operator and/or downloaded from a remote server SRVR connected to the WAN 30, such as a server managed by the provider of the SNMP.

For instance, in various embodiments, the computer 40*a* manages a whitelist 1030 of X.509 certificates CERT deemed reliable. For instance, this list 1030 may comprise certificates (potentially also self-signed ones) deemed reliable.

In various embodiments, the computer 40*a* may also manage one or more other whitelists. For instance, the computer 40*a* may compare the IP address or the domain name of the server SRV with one or more whitelists:

- a whitelist 1032 of servers SRV deemed reliable, for example identified via one or more respective IP and/or FQDN (Fully Qualified Domain Name) addresses, i.e., a string made up of a host name and a domain name, for example, "mail.aizoongroup.com"; and/or
- a whitelist 1034 of domain names deemed reliable, for example, "aizoongroup.com"; and/or
- a whitelist 1036 of popular CDNs (Content Delivery Networks).

In particular, in the case where the data of a given element (metadata MD and/or the data of the certificates CERT) satisfy at least one of these rules, i.e., they are comprised in at least one of the above lists, the computer 40*a* is configured for removing the corresponding element since the elements in the above lists 1030-1036 indicate servers SRV deemed reliable.

As explained previously, the computer 40*a* then analyses, in a step 1008, the elements not filtered/rejected in step 1006, in such a way as to detect potential anomalies. In particular, one of the main purposes of this analysis is the detection of connections set up by a malware that has infected a client DEV of the LAN 10 towards a remote server SRVR, which acts as command and control center for the malware. In particular, also these connections can be encrypted using the SSL protocol or TLS protocol, and consequently the SNMP is not able to analyse the contents of the transmitted packets. However, the computer 40*a* can analyse the contents of the messages exchanged during the respective SSL or TLS handshaking step.

In this context, it is known that some fields of the Client Hello message 500 provide indications on the program that has sent this message. Consequently, these data may be used for identifying the program that has sent the request. For instance, in various embodiments, the computer 40*a* may determine a signature h1 as a function of one or more data of the Client Hello message 500, which the client DEV sends to the server SRV for starting the handshake procedure. For instance, in various embodiments, the first signature h1 is determined as a function of one or more (possibly all) of the following data sent with the Client Hello message 500: the version of the TLS/SSL protocol, the encryption algorithms supported by the client DEV, the values of possible extensions used, the enumeration of the elliptical curves supported, and the formats of the elliptical curves. For instance, in various embodiments, the respective values (for example, expressed in hexadecimal values) may be concatenated to form a string. In various embodiments, the signature h1 may correspond to the aforesaid string or be determined by calculating a hash code for this string, for example using the MD5 (Message Digest 5) algorithm or an SHA (Secure Hash Algorithm). For instance, in the past the JA3 hash code has been proposed for this purpose.

Consequently, the signature h1 provides indications on the application used by the client DEV to send the Client Hello message 500. However, the inventors have noted that these signatures h1 also change for various commonly used programs, or even just for the different versions of one and the same program. For instance, different browsers or versions of browser frequently support different algorithms and elliptical curves, which lead to a different signature h1. Consequently, a given signature h1 may not be the sole discriminant for detecting a malware.

Likewise, the computer 40*a* may determine a signature h2 as a function of one or more data of the Server Hello message 502 that the server SRV sends to the client DEV. For instance, the signature h2 may be determined for one or more of the following fields of the Server Hello message 502 sent by the server SRV: the version of the TLS/SSL protocol, the encryption algorithm selected, and the values of possible extensions used. Also in this case, the respective values (for example, expressed in hexadecimal values) may be concatenated to form a string, which in turn may be used for calculating a hash code h2, for example using the algorithm MD5 or SHA-1. For instance, in the past the JA3S hash code has been proposed for this purpose. Consequently, the second signature h2 provides indications on the application used by the server SRV to send the Server Hello message 502. However, the inventors have noted that these signatures h2 are frequently not very indicative.

Instead, as mentioned previously, the chains of certificates allow unique identification of the communications with specific servers. In various embodiments, the computer 40*a* (or the data-traffic sensor) is hence configured for obtaining the certificates of the chain of certificates supplied by the server SRV, i.e., the end-entity certificates EEC and possible further intermediate-entity certificates IEC and/or the root certificates RC. In this context, the inventors have noted that the chains of certificates supplied by the malware command and control centers may comprise incongruences; for example, the end-entity certificates EEC are frequently self-signed certificates. However, as mentioned previously, the use of self-signed certificates may even be quite usual.

Consequently, in various embodiments, to distinguish usual requests from random requests of a malware to its own command and control center, the computer 40*a* is configured for learning, in step 1008, the normal behaviour of the clients DEV of the LAN 10. In various embodiments, the computer 40*a* is configured to determine for this purpose the occurrence of certain types of Client Hello messages 500 and the occurrence of certain types of chains of certificates supplied with the Server Hello messages 502.

As explained previously, to identify Client Hello messages 500 of a given type, the computer 40*a* may determine the signature h1, such as a hash code calculated for the fields mentioned previously. Likewise, the computer 40*a* may also determine a signature h3 for one or more data of the certificates CERT of the chain of certificates supplied by the server SRV along with the message 502.

For instance, in various embodiments, the computer 40*a* is configured to extract from each certificate supplied by the server SRV (i.e., the end-entity certificates EEC, a possible root certificate RC and possible intermediate certificates IEC) the signature saved in the field SIG, for example the corresponding identifying SHA-1 hash code. In various embodiments, the computer 40*a* then concatenates the hash codes obtained for the chain of certificates. In various embodiments, the string resulting from concatenation of these hash codes may hence correspond to the signature h3 or may be used to determine the signature h3 by calculating a single hash code for the string, for example by means of the algorithm MD5 or SHA-1. Alternatively, the hash code h3 associated to the certification chain could also be calculated directly on the basis of the data of all the certificates of the chain of certificates.

Consequently, in various embodiments, the computer 40*a* is configured for obtaining:
- a first signature (for example, a hash code) h1 determined for one or more data of the Client Hello message 500 that the client DEV sends to the server SRV for starting the handshake procedure;
- a second signature (for example, a hash code) h3 determined for one or more data of the certificates contained in the Server Hello message 502 that the server SRV sends to the client DEV; and
- optionally a third signature (for example, a hash code) h2 determined for one or more other data of the Server Hello message 502 that the server SRV sends to the client DEV.

In general, these signatures (hash codes) h1, h2 and/or h3 may be determined by the computer 40*a* in step 1026 or be pre-calculated (for example, in the data-traffic sensor) and included in the metadata MD.

Consequently, in various embodiments, to detect, in step 1008, usual behaviours and/or communications, the computer 40*a* may take into consideration the popularity, i.e., the number of occurrences, of the previous signatures h1, h3, and possibly h2.

For instance, when a given element/handshake has not been rejected in step 1006, the computer 40*a* may obtain in a step 1040 the respective signatures h1 and h3 (and possibly h2). Next, the computer 40*a* may check whether the signature h1 is included in a first list L1. In the case where the signature h1 is not included in the list L1, the computer 40*a* may add the signature h1 to the list L1, preferably in an orderly manner in such a way as to speed up the search. Moreover, the computer 40*a* may associate to the signature h1 stored in the list L1 a respective initial count value (for example, set to one), for instance saving the initial count value along with the signature h1 in the list L1. Consequently, in the case where the signature h1 is included in the list L1, the computer 40*a* may increment the respective count value associated to the signature h1. Likewise, the computer may manage a list L3 for the signatures h3, and possibly a list L2 for the signatures h2. Consequently, analysing sequentially the elements provided by step 1006, each list L1, L2, and possibly L3 comprises only unique signatures h, and the count value associated to a given signature h corresponds to the occurrence c(h) of the signature. However, also other solutions may be used to determine, for the current monitoring interval, the respective unique signatures h1, h3, and possibly h2, and for each unique signature the respective occurrence.

In various embodiments, the popularity value tf(h) of each unique signature h is then calculated by normalizing the respective occurrence value c(h). For instance, in various embodiments, the computer 40*a* determines the total number C of the elements supplied by step 1006, for example incrementing the value C for each element or calculating the total of the numbers of counts saved in one of the lists L1, L2, or L3. For instance, in this case the popularity of a given unique signature h may be calculated applying the term-frequency equation tf(h):

$$tf(h) = \frac{c(h)}{C}$$

Alternatively, the value C could correspond to the maximum value c(h) obtained respectively for the signatures h1, h2, or h3. For instance, in the case where the signature h belongs to the list L1, the value C could correspond to the maximum count value saved for the list L1.

In various embodiments, the computer 40*a* may then associate to each unique hash code h the respective popularity, for example storing the respective popularity value tf(h) in the respective list L1, L2, and L3, possibly replacing the previous count value c(h). Consequently, in various embodiments, the computer 40*a* determines in step 1040:
- a first list L1 of unique signatures h1 and respective popularity values tf(h1);
- a second list L3 of unique signatures h3 and respective popularity values tf(h3); and
- optionally a third list L2 of unique signatures h2 and respective popularity values tf(h2).

The values tf(h1), tf(h2), and tf(h3) hence indicate, respectively, the popularity of the respective client-side application, of the respective server-side application or respective server-side behaviour and of the respective chain of certificates. However, the previous data do not provide indications with reference to possible anomalies of the certificates CERT.

Consequently, in various embodiments, the computer 40*a* verifies, in step 1040, also one or more conditions for each chain of certificates. These indicators may be determined for each element/handshake that is analysed. Alternatively, since each chain of certificates should be identified uniquely via the respective signature h3, these indicators may be saved for the respective signature h3 in the list L3.

For instance, in various embodiments, the computer 40*a* verifies, in step 1040, one or more of the following conditions:
- the end-entity certificate EEC (or a certificate CERT of the chain of certificates, preferably excluding the root certificates RC) has been signed by the server SRV (or by the CA) itself, i.e., the subject field SN corresponds to the field of the issuer IN, the so-called self-signed certificate;
- the end-entity certificate EEC (or a certificate CERT of the chain of certificates) has expired;
- the end-entity certificate EEC (or a certificate CERT of the chain of certificates) has an anomalous validity; for example, the duration between the starting date and the ending date indicated in the field POV is shorter than a given threshold, for example, less than 3 days;
- the domain name saved in the common name CN of the field SN of the end-entity certificate EEC (or of a certificate CERT of the chain of certificates) has an invalid first-level domain;
- the domain name saved in the common name CN of the field SN of the end-entity certificate EEC does not correspond to the domain name to which the respective client DEV has sent the respective Client Hello message 500 (as indicated, for example, in the metadata MD);
- one or more of the values of the fields SN (subject) or IN (issuer), in particular the subfields common-name CN, locality L, and/or organization O, of the end-entity certificate EEC (or of a certificate CERT of the chain of certificates) comprise data that are not correct and/or that seem to be generated randomly;
- the country C declared in the field SN of the end-entity certificate EEC (or a certificate CERT of the chain of certificates) is invalid; and
- the end-entity certificate EEC (or a certificate CERT of the chain of certificates) has been signed with a weak signature algorithm; for example, the certificate has been signed with the algorithm sha-1WithRSAEncryption or md5WithRSAEncryption using a key the length of which is less than 2048 bits.

For instance, to verify whether one of the values of the fields SN and/or IN comprises more or less random data, the computer 40*a* may be configured to determine how close the distribution of their unigrams and bigrams is to that of randomly generated strings. For instance, this measurement may be obtained using the same approach as that used by a random-string detector based upon a two-character Markov chain. The Markov chain is trained on the pairs of successive characters extracted from a few megabytes of text (for example, in English), to enable the model to learn what is the probability distribution of appearance of a character subsequent to one supplied as input. Hence, the trained Markov chain, supplied with a string s as input, supplies as output a probability p that indicates how closely the string s follows the distribution of the language: the greater the similarity with an English word, the greater the resulting probability. A threshold is then calculated to differentiate legitimate strings from randomly generated strings: this is chosen in the range of values that goes from the lowest probability, obtained by supplying words (for example, in English) as input to the trained Markov chain, to the highest probability obtained by supplying as input thereto randomly built strings. Hence, if p is higher than the threshold, then the input string is considered legitimate.

In particular, random-field analysis is useful for detecting Tor connections that typically indicate a violation of company policies and/or a potential malicious activity: in fact, these connections frequently contain, in the end-entity certificate EEC supplied to the client DEV, names associated to the servers, subjects, and issuers having random values.

In various embodiments, the parameters provided previously (popularity values and indicators) are then supplied as input to a classifier 1042. For this purpose, each indicator may be identified by a binary value, for example, "1" when the condition is satisfied and "0" when the condition is not satisfied. For instance, in various embodiments, the classifier 1042 receives as input the following parameters, or so-called features, for each element/handshake supplied by step 1006:
- the popularity tf(h1) of the signature h1 (for example, JA3) determined for the respective Client Hello message 500;

the popularity tf(h3) of the signature h3 determined for the respective chain of certificates CERT;

optionally the popularity tf(h2) of the signature h2 (for example, JA3S) determined for the other fields of the Server Hello message 502; and one or more (possibly all) of the indicators determined for the respective chain of certificates CERT.

In this context, the inventors have noted that the estimate of the classifier 1042 may be improved by replacing one or more of the previous binary indicators with respective count values, for example:

the number of self-signed certificates present in the chain, preferably normalized on the basis of a chosen value, representing the maximum length that a chain of certificates can reach (for example, 100);

the number of expired certificates present in the chain, preferably normalized on the basis of a chosen value, representing the maximum length that a chain of certificates can reach (for example, 100);

the number of certificates that bear an anomalous validity (for example, a validity lower than 3 days) present in the chain, preferably normalized on the basis of a chosen value, representing the maximum length that a chain of certificates can reach (for example, 100); and the number of certificates signed with a weak signature algorithm present in the chain, preferably normalized on the basis of a chosen value, representing the maximum length that a chain of certificates can reach (for example, 100).

In general, instead of replacing an indicator, the respective number of occurrences may be also added as additional feature. Consequently, the indicators and/or the counters may indicate the fact that at least one of the certificates of the chain satisfies the respective condition.

In particular, in various embodiments, the classifier 1042 is implemented with a machine-learning algorithm. In particular, in various embodiments, the classifier is configured for classifying just a single class on the basis of a training dataset. Consequently, in this case, the classifier supplies as output a datum that indicates whether a given combination/set of input features belongs to this class or not. In general, the value supplied as output could also correspond to a continuous value, for example between 0 and 1, which thus indicates with what probability a set of features belongs to the class. Consequently, the training dataset may be obtained by monitoring the data traffic of the LAN 10 during a training time interval (with normal operation of the LAN 10), obtaining the values of the corresponding features as described with reference to step 1040, i.e., determining (in addition to the indicators and/or counters) for each element also the respective popularity tf(h) of the signatures h1, h3, and possibly h2. Consequently, the computer 40a may be configured for training the classifier 1042 in such a way as to recognise, during the training interval, what are the values of the features that represent a normal behaviour.

In particular, in various embodiments, the classifier 1042 is implemented with a support vector machine (SVM), configured for classifying a single class. Single-class SVMs are models, widely used in machine learning, which have the aim of finding a hypersphere that best circumscribes all the instances used in the training phase. Through the appropriate adjustment of its hyperparameters, it is possible to exclude trivial solutions, such as the one represented by the hypersphere with infinite radius.

Consequently, the classifier 1042 is configured for estimating, for each element supplied by step 1006, a respective state (i.e., normal or suspect/anomalous) as a function of the respective set of features determined by the element itself. In this way, the classifier 1042 is able to detect elements that deviate—as regards one or more characteristics—from the ones observed in the LAN 10 during the training step. For instance, in this way, the classifier 1042 is able to learn the habitual use of certain "non-secure" certificates (identified via the respective signature h3) that are habitually used in the LAN 10. Consequently, the computer 40a is able to detect suspect SSL and/or TLS handshaking steps (and hence respective secure communications), for example:

when an application (presumably a malware) sends a Client Hello message 500 with unusual parameters to a remote server SRVR; and/or when a server SRV supplies a new chain of certificates CERT that includes incongruences.

In various embodiments, to reduce the risk of false positives, the computer 40a may filter further the elements deemed suspect in a step 1044.

For instance, in various embodiments, to detect principally malware, the computer 40a may be configured to remove/filter the elements deemed anomalous/suspect in step 1042, which, however, have been generated by applications that are commonly used (as indicated by the popularity tf(h1) of the respective signature h1) and/or that use a chain of certificates that is commonly used (as indicated by the popularity tf(h3) of the respective signature h3).

Consequently, the computer 40a may be configured to remove/filter an element deemed anomalous/suspect, when the respective popularity value tf(h1) exceeds a first threshold TH1 and/or the respective popularity value tf(h3) exceeds a second threshold TH2.

The inventors have noted that the popularity values tf(h) of the unique signatures h, for example of the signatures h1, follow the distribution of the power law. However, the threshold TH (TH1 or TH2) used to determine the least popular signatures may vary on the basis of the behaviour of the network. Consequently, in various embodiments, the computer 40a is configured to determine the threshold TH dynamically on the basis of the distribution of the popularity values tf(h) of the respective unique signatures h.

For instance, in various embodiments, the computer 40a uses for this purpose a Jenks optimization of the intervals, as described for example in Jenks, George F., 1967, *"The data Model Concept in Statistical Mapping"*, International Yearbook of Cartography 7: 186-190. Basically, this method allows to split the elements of a list (i.e., the popularity values tf(h) of the unique signatures h of the respective list L1, L2, or L3) into classes minimizing the variance within each class and, at the same time, maximizing it between the different classes. The goodness-of-variance fit (gvf) measures the divergence between the predicted class and the values observed. The Jenks algorithm hence consists in the iterative calculation of the gvf displacing each time one value from the class having the greater deviations from the mean to the class having the smaller deviations, until the sum of the deviations within the class reaches a minimum.

Hence, the computer 40a may first calculate what is the optimal number of intervals that enables the maximum gvf to be reached—using the Jenks method—and then, once again applying the optimization method and supplying as input thereto the optimum number of intervals for dividing the input signatures into classes. Consequently, at this point, the computer 40a may select all the hash codes contained in the last class (i.e., the least popular hash codes). Basically, for this purpose, the computer 40a may use as threshold TH the value tf(h) of the signature in the class of least popular hash codes that has the highest value tf(h), then filtering all the signatures with a value higher than the threshold TH.

Consequently, the computer 40a may in this way determine the threshold TH1 as a function of the popularity of the elements in the list L1 and/or the threshold TH2 as a function of the popularity of the elements in the list L3. Specifically, in various embodiments, while the classifier 1042 is being trained on the basis of a training dataset obtained during a training interval, the thresholds TH1 and/or TH2 are determined dynamically on the basis of the data of the current monitoring interval, and thus follow the behaviour of the LAN 10.

In various embodiments, the classifier 1042 and the possible additional filter 1044 may be used only for pre-classifying suspect elements/handshakes, and an additional step 1046 may be used for calculating for each element/handshake deemed suspect a respective anomaly probability value A using for this purpose a cost function that takes into consideration the corresponding set of features of the element under analysis. In general, the set of features used by the classifier 1042 and the set of features used by the cost function may also be different. For instance, in addition to the popularity values tf(h1) and tf(h3), the classifier may use the parameters that indicate the fact that at least one of the certificates of the chain of certificates is self-signed and at least one of the certificates of the chain of certificates has expired. Instead, the cost function may also use the parameters that indicate the fact that at least one of the certificates of the chain of certificates has an anomalous validity and at least one certificate of the chain of certificates is signed with a weak signature algorithm.

In various embodiments, one or more parameters of the above cost function are configurable, for example via the terminal 406 illustrated in FIG. 1.

For instance, in various embodiments, the cost function corresponds to a weighted sum, in which the value of each feature, or its inverse, is multiplied by a respective weight. For instance, the value of a feature and/or the value of a counter may be multiplied by a corresponding specific weight, whereas another may be used for multiplying the inverse of the popularity value of a given element. In this case, therefore, the weights may be configured in an appropriate way.

As an alternative or in addition, in various embodiments, the computer 40a enables comparison of some parameters (for example, a probability or a counter) with a reference value or a threshold. For instance, in this way, an operator may decide that elements with a popularity value tf(h1) and/or tf(h3) higher than a given threshold are never considered anomalous, for example, in this case choosing a threshold that is lower than the respective threshold determined in step 1044. Alternatively, the threshold TH1 could be determined automatically in step 1044 and the threshold TH2 could be configured by an operator.

For instance, in this way, the anomaly probability value A may be increased when the frequency tf(h) of the respective hash code h3 has a value lower than a given threshold. In this context, the inventors have noted that a simple weight is typically sufficient for the indicators and/or counters. Instead, there frequently emerge particular needs for the popularity values tf(h1), tf(h3), and optionally tf(h2). Consequently, to increase the flexibility of the cost function, in various embodiments, the anomaly probability value A is calculated for the indicators and counters by means of a weighted sum. In addition, to the aforesaid anomaly probability value A there are then added respective values calculated for the popularity values tf(h1), tf(h3), and optionally tf(h2), where each value is calculated through a respective generalized logistic function (or Richard's curve), which receives as input the respective popularity value.

Consequently, in various embodiments, the computer 40a may compare, in step 1010, the anomaly probability value A with a threshold, and proceed to step 1012 when the anomaly probability value A is higher than a threshold.

Of course, without prejudice to the underlying principles of the invention, the details of construction and the embodiments may vary widely with respect to what has been described and illustrated herein purely by way of example, without thereby departing from the scope of the present invention, as defined by the annexed claims.

The invention claimed is:

1. A method of detecting anomalies in SSL and/or TLS communications transmitted via a communication network, wherein the method comprises the steps of:
   analyzing data packets (DP) transmitted via said communication network for detecting SSL and/or TLS handshake procedures in a monitoring interval, wherein each SSL or TLS handshake procedure comprises a first message transmitted from a respective client (DEV) to a respective server (SRV) for starting the respective SSL or TLS communication, and a corresponding second message transmitted from the respective server (SRV) to the respective client (DEV), wherein the first message comprises data which identify one or more SSL or TLS functionalities supported by said client (DEV), and wherein the second message comprises one or more certificates (CERT) of a certificate chain (EEC, IEC, RC);
   determining for each handshake procedure a first signature (h1) as a function of the data transmitted with said first message and a second signature (h3) as a function of the data of said one or more certificates (CERT) of said certificate chain (EEC, IEC, RC) transmitted with said second message;
   analyzing said first signatures (h1) for determining respective first univocal signatures and respective first values of occurrences in said monitoring interval, and computing for each first univocal signature a first popularity value (tf(h1)) by normalizing the respective first value of occurrences;
   analyzing said second signatures (h3) for determine respective second univocal signatures and respective second values of occurrences in said monitoring interval, and computing for each second univocal signature a second popularity value (tf(h3)) by normalizing the respective second value of occurrences;
   extracting from each certificate chain (EEC, IEC, RC) a plurality of parameters which indicate the fact that:
     at least one of the certificates (CERT) of the certificate chain (EEC, IEC, RC) is self-signed, and
     at least one of the certificates (CERT) of the certificate chain (EEC, IEC, RC) is expired;
   during a training phase, wherein said monitoring interval corresponds to a condition for learning the behavior of the communication network, generating a training dataset, which comprises for each handshake procedure the first popularity value (tf(h1)) of the respective first signature (h1), the second popularity value (tf(h3)) of the respective second signature (h3) and the respective plurality of parameters determined as a function of the data of the respective certificate chain (EEC, IEC, RC), and training a classifier by using said training dataset, whereby said classifier is configured to provide in output a value, which indicates whether a given handshake procedure corresponds to a usual or unusual handshake procedure; and during normal operation, using said classifier for providing in output, for each handshake procedure, a respective value which indicates whether the respective handshake procedure corresponds to a usual or unusual handshake procedure and, in case at least one handshake procedure is classified as unusual, generating a notification, which indicates that the respective SSL or TLS communication represents an anomaly.

2. The method according to claim 1, wherein said classifier is configured to classify only a single class based on said training dataset, wherein said single class is associated with usual handshake procedures.

3. The method according to claim 1, wherein said classifier comprises a Support Vector Machine configured to classify a single class.

4. The method according to claim 1, wherein said first signature (h1) is a first hash code computed as a function of the data transmitted with said first message, wherein each certificate (CERT) comprises a signature field (SIG), and wherein said second signature (h3) is a second hash code computed as a function of the signatures (SIG) of said one or more certificates (CERT) of said certificate chain (EEC, IEC, RC).

5. The method according to claim 1, wherein said plurality of parameters indicates at least one of:
at least one of the certificates (CERT) of the certificate chain (EEC, IEC, RC) has an unusual validity, and
at least one certificate (CERT) of the certificate chain (EEC, IEC, RC) is signed with a weak signature algorithm.

6. The method according to claim 1, wherein each certificate (CERT) comprises a first field (SN) for identifying a subject to which has been issued the certificate (CERT) and a second field (IN) for identifying an issuer which has issued the certificate (CERT), wherein said first field (SN) and said second field (IN) comprise respective sub-fields for specifying a common name (CN), a locality (L) and an organization (O), and wherein said plurality of parameters further indicate at least one of:
the domain name stored in the common name sub-field (CN) of the first field (SN) and/or of the second field (IN) of at least one certificate (CERT) of the certificate chain (EEC, IEC, RC) has an invalid first level domain;
the domain name stored to the common name sub-field (CN) of the first field (SN) of the certificate (EEC) of the certificate chain (EEC, IEC, RC) which relates to an end-entity does not correspond to the domain name to which the respective first message has been sent to;
one or more of the sub-fields of the first field (SN) and/or of the second field (IN) of at least one certificate (CERT) of the certificate chain (EEC, IEC, RC) comprises data classified as generated randomly; and
a country code stored in a country sub-field (C) of the first field (SN) and/or of the second field (IN) of at least one certificate (CERT) of the certificate chain (EEC, IEC, RC) is invalid.

7. The method according to claim 1, wherein said computing a respective first or second popularity value for each first or second univocal signature is obtained by normalizing the respective first or second value of occurrences and comprises:
determining the total number (C) of said handshake procedures in said monitoring interval, and computing the first or second popularity value by dividing the respective first or second value of occurrences by said total number (C); or
determining the maximum value of said first or second values of occurrences, and computing the first or second popularity value by dividing the respective first or second value of occurrences by said maximum value.

8. The method according to claim 1, comprising during normal operation:
filtering said handshake procedures or said handshake procedures classified as unusual, in order to remove the handshake procedures for which the respective first popularity value (tf(h1)) is greater than a respective first threshold and/or the respective second popularity value (tf(h3)) is greater than a respective second threshold.

9. The method according to claim 8, comprising during normal operation:
determining the first univocal signatures being less popular in said monitoring interval, preferably via a Jenks natural breaks optimization, and using as first threshold the maximum popularity value (tf(h1)) of the less popular first univocal signatures, and/or
determining the second univocal signatures being less popular in said monitoring interval, preferably via a Jenks natural breaks optimization, and using as second threshold the maximum popularity value (tf(h3)) of the less popular second univocal signatures.

10. The method according claim 1, comprising during normal operation:
computing for each of said handshake procedures classified as unusual a respective probability value (A) as a function of a parameterized cost function, which takes into account the first popularity value (tf(h1)) of the respective first signature (h1), the second popularity value (tf(h3)) of the respective second signature (h3) and the respective plurality of parameters determined as a function of the data of the respective certificate chain (EEC, IEC, RC); and
in case at least one of said probability values (A) is greater than a threshold, generating said notification which indicates that the respective SSL or TLS communication represents an anomaly.

11. The method according claim 1, comprising filtering said handshake procedures for removing the respective handshake when:
the certificate (EEC) of the respective certificate chain (EEC, IEC, RC) which relates to an end-entity is included in a first list and/or
the IP address and/or the Fully Qualified Domain Name of the respective server (SRV) is included in a second list and/or
the domain name of the respective server (SRV) is included in a third list.

12. A device configured to implement the method according to claim 1.

13. A computer-program product that can be loaded into the memory of at least one processor and comprises portions of software code for implementing the steps of the method according to claim 1.

* * * * *